US011598352B2

(12) United States Patent
Frommelt

(10) Patent No.: US 11,598,352 B2
(45) Date of Patent: Mar. 7, 2023

(54) HYDRAULIC COMPONENT CONNECTION DEVICE

(71) Applicant: AGCO International GmbH, Neuhausen (CH)

(72) Inventor: Benjamin Frommelt, Marktoberdorf (DE)

(73) Assignee: AGCO International GmbH, Neuhausen (CH)

(*) Notice: Subject to any disclaimer, the term of this patent is extended or adjusted under 35 U.S.C. 154(b) by 0 days.

(21) Appl. No.: 17/456,758

(22) Filed: Nov. 29, 2021

(65) Prior Publication Data

US 2022/0186754 A1 Jun. 16, 2022

(30) Foreign Application Priority Data

Dec. 11, 2020 (GB) ..................................... 2019548

(51) Int. Cl.
*F15B 13/02* (2006.01)
*F15B 15/26* (2006.01)
*F15B 1/04* (2006.01)

(52) U.S. Cl.
CPC ................ *F15B 13/02* (2013.01); *F15B 1/04* (2013.01); *F15B 15/26* (2013.01)

(58) Field of Classification Search
CPC . F15B 1/04; F15B 15/26; F15B 13/02; B01D 35/16; B01D 2201/4015; B01D 2201/4023
See application file for complete search history.

(56) References Cited

U.S. PATENT DOCUMENTS

| | | | |
|---|---|---|---|
| 2,638,915 | A | 5/1953 | Mitchell |
| 2003/0178849 | A1 | 9/2003 | Hayashi et al. |
| 2014/0027361 | A1 | 1/2014 | Pennington |
| 2017/0059032 | A1 | 3/2017 | Son et al. |
| 2018/0229164 | A1 | 8/2018 | Linhart |

FOREIGN PATENT DOCUMENTS

| | | | |
|---|---|---|---|
| DE | 102 37 668 | A1 | 3/2003 |
| EP | 0099751 | A1 | 2/1984 |
| EP | 1 094 203 | A1 | 4/2001 |

OTHER PUBLICATIONS

UK Intellectual Property Office, Search Report prepared for priority Application No. GB2019548.3, dated Apr. 27, 2021.
European Patent Office, Search Report for related European Patent Application No. EP2120698.5, dated Mar. 4, 2022.

*Primary Examiner* — Abi Y Teka
*Assistant Examiner* — Daniel S Collins

(57) ABSTRACT

An assembly system for components of a pressurized fluid supply system for an agricultural vehicle includes a body having at least one fluid duct connectable at one end to a pressurized fluid supply and having a socket at the other end. A detachable component such as an accumulator or oil filter is connectable in releasable mechanical engagement with the body to receive pressurized fluid from the at least one fluid duct. The engagement results from insertion of at least a portion of the component into the socket and rotation of the component to a locked position. The body has at least one discharge duct extending therethrough. In a partially rotated position of the component portion within the socket, the component remains mechanically attached to the body and the fluid duct and discharge duct are in fluidic connection, discharging accumulated pressure in the fluid duct.

14 Claims, 8 Drawing Sheets

Detail X

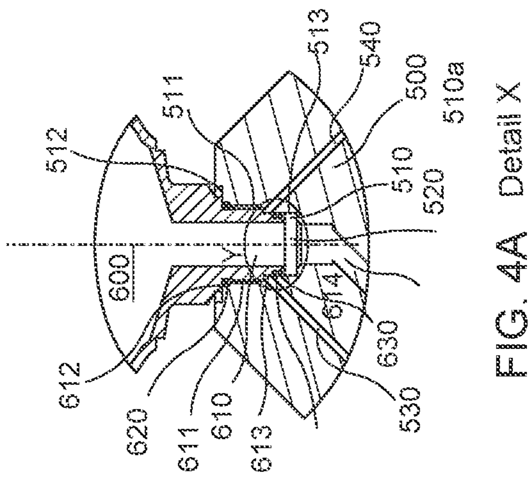
FIG. 4A Detail X
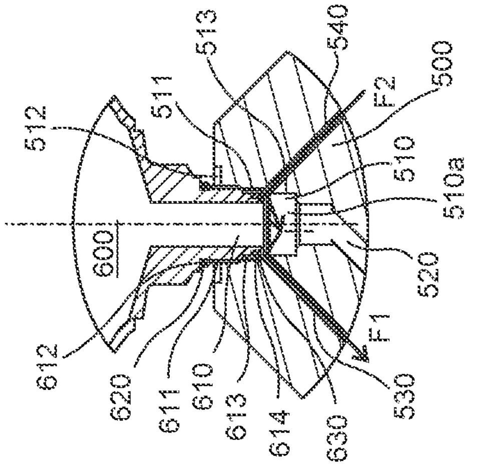
FIG. 4C Detail X
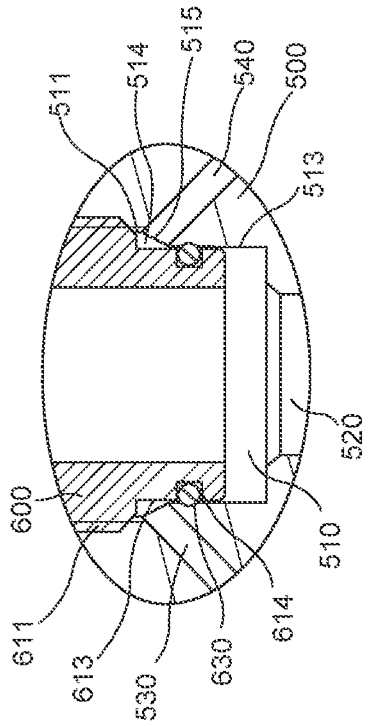
FIG. 4B Detail Y
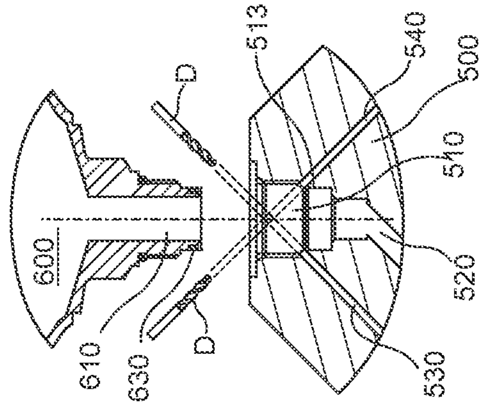
FIG. 4D Detail X Detail Z

HYDRAULIC COMPONENT CONNECTION DEVICE

CROSS-REFERENCE TO RELATED APPLICATIONS

This application claims the benefit of the filing date of U. K. Patent Application 2019548.3, "Hydraulic Component Connection Device," filed Dec. 11, 2020, the entire disclosure of which is incorporated herein by reference.

FIELD

Embodiments of the present disclosure relate generally to a connection system for use in a pressurized fluid supply system in a vehicle, especially an agricultural vehicle such as a tractor.

BACKGROUND

The consumers in a supply system are connected with lines which are also named as circuits in the following description. It will be understood that the term "circuit" as used herein is not limited to a closed loop arrangement of lines and may refer to arrangements as simple as a single line linking two components or consumers.

Furthermore, it will be understood that the terms "motor" and "pump" as used herein describe fluid driven machines or, especially hydraulically or hydrostatically driven motors and pumps.

Modern tractors are equipped with various consumers requiring hydraulic supply. The hydraulic supply is conventionally provided by a hydraulic pump supplying pressurized fluid from a tank or reservoir.

These supply systems contain components such as the accumulators, which provide damping reservoirs, and which require regular maintenance. To facilitate this, they are configured to be easily disassembled by using screw-in connections, bayonet joints, or any other means to allow quick detachment and reattachment of components.

In recent decades the increased power demand on tractors and especially for the hydraulic supply system has resulted in the required available pressure level in the hydraulic supply circuit to now be up to 250 bar, with the tendency to further increase. In construction equipment, pressure levels of 500 bar are already used.

As this pressure level may remain in the hydraulic circuit also during maintenance, serious accidents have happened when pressurized components (e.g., hydraulic accumulators or oil filters) are disassembled under high pressure.

Suggestions have been made to provide pressure monitoring and automatic shut-down. This monitoring can be costly and, in some circumstances, not feasible as it may be disadvantageous to shut off the supply during maintenance.

It is an object of the present disclosure to provide a component assembly including connection means that addresses the issue with minimum costs and installation space but high functional safety.

BRIEF SUMMARY

In some embodiments, a pressurized fluid supply system for an agricultural vehicle includes a body having at least one fluid duct extending therethrough from a first end to a second end. The fluid duct is configured to connect at the first end to a pressurized fluid supply via a first connection. The fluid duct has a socket at the second end. The system has a detachable component connectable in releasable mechanical engagement with the body to receive pressurized fluid from the at least one fluid duct. The engagement results from insertion of at least a portion of the component into the socket and rotation of the component to a locked position. The body defines at least one discharge duct extending therethrough from a first end exiting the body to a second end intersecting the socket. In a partially rotated position of the component portion within the socket, the component remains mechanically attached to the body and the fluid duct and discharge duct are in fluidic connection. The locked position comprises a fully rotated position of the component portion within the socket in which position the component portion blocks the fluidic connection between the fluid duct and discharge duct.

By this provision of a "two-step" disconnection arrangement, by which accumulated fluid pressure is automatically vented from the fluid duct to a discharge duct by opening of the fluidic connection before the removable component (e.g., an accumulator, oil filter, etc.) is mechanically disconnected from the mounting body, a simple safety procedure is effected which does not require specialized and complex monitoring of machine state, yet prevents "blow-out" of these disposable/detachable components which can otherwise cause injury.

In some embodiments, the body is a valve block comprising at least one valve slider intersecting the at least one fluid duct, typically with the slider forming part of a valve assembly used in controlled connection to one or more accumulators in a control system for the agricultural vehicle.

In some embodiments, the body may be a driveline housing, which housing includes a fluid reservoir to which the first end of the at least one discharge duct connects to provide a destination for discharged fluid. Alternately, the first end of the discharge duct may connect to a tank line connection to the sump of a vehicle hydraulic system to provide a destination for the discharged pressurized fluid.

In some embodiments, the body may also define a second fluid duct with a respective socket to receive a second detachable component (such as an accumulator or filter), and the body is then provided with a second discharge duct which is connectable to the second fluid duct. Additional fluid ducts and detachable components are within the scope of the present disclosure.

The second discharge duct may be connected to the first discharge duct via a ring chamber of the socket of the first fluid duct.

As described with respect to embodiments of the disclosure below, various sealing arrangements may be provided which block fluid flow between the at least one fluid duct and the discharge duct when the detachable component is in the locked position. These arrangements may include radial seals or end stop seals within the socket or sockets by which the detachable component(s) are attached to the body. For at least the first discharge duct, this may suitably join the aperture provided by the first socket at either on one of the cylindrical sidewalls, or on a base of the aperture. In either case, the arrangement is such that the exhausting of the pressurized duct to the discharge duct occurs when the detachable component is only partially detached from the body.

In some embodiments, the connection of the detachable component(s) may be a threaded connection (where the detachable component comprises a first threaded portion configured to engage with a corresponding threaded bore in the socket) or it may be in the form of a bayonet connection where the detachable component is mounted by insertion and turning (against spring pressure in some embodiments) in the manner of a bayonet-mounted lightbulb.

In some embodiments, the connection (whether screw or bayonet or otherwise) of the detachable component(s) has a radial sealing.

Where the connection is a bayonet joint, the joint may include a groove having two intermediate portions whereby a step, corner, or other interruption in the grove between the intermediate portions holds the detachable component mechanically connected to the body while allowing the pressure in the fluid duct to exhaust via the discharge duct, until the connecting part is further rotated to allow it to be withdrawn from the socket.

Further features and advantages of the disclosure are recited in the claims attached hereto and/or will become apparent from reading the following description of embodiments of the disclosure.

BRIEF DESCRIPTION OF THE DRAWINGS

One or more embodiments of the disclosure will now be described, by way of example only, with reference to the accompanying drawings, in which:

FIG. 4A shows detail X of FIG. 3 with the connection system according to an embodiment of the disclosure in a first position;

FIG. 4B shows detail Y of FIG. 4A in greater detail;

FIG. 4C shows detail X of FIG. 3 with the connection system according to an embodiment of the disclosure in a second position;

FIG. 4D shows detail X of FIG. 3 with the connection system according to an embodiment of the disclosure in a third position;

DETAILED DESCRIPTION

Figure 1:
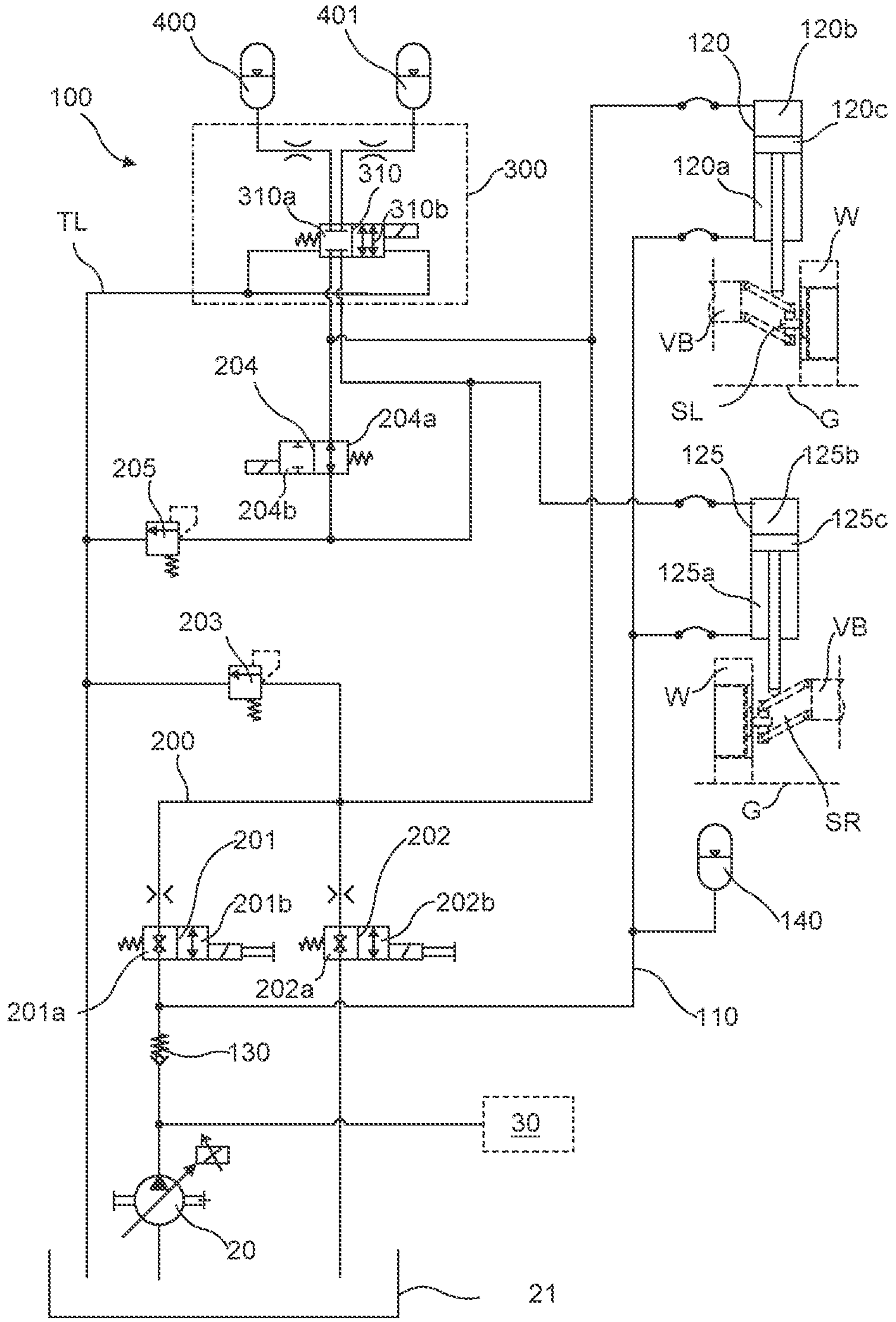
FIG. 1 shows a pressurized fluid supply system known in the art.
Figure 8:
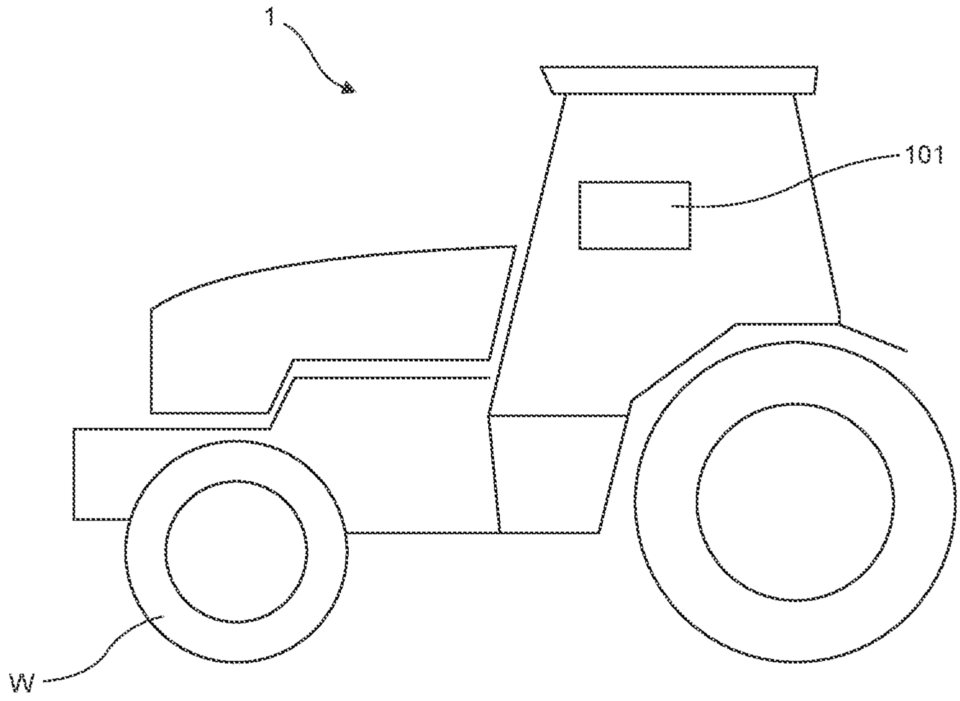
FIG. 8 illustrates a vehicle in the form of an agricultural tractor in which the assembly system according to the disclosure is incorporated.

The fluid supply system shown in FIG. 1 has a main pump 20 for supplying pressurized hydraulic fluid (oil) to different circuits on an agricultural vehicle such as a tractor 1 illustrated generically in FIG. 8.

The main pump 20 is of variable displacement type and operable to generate a fluid pressure of up to 250 bar. Pump 20 supplies various consumers on the tractor, for example front and/or rear linkages, main valve manifold or Power Beyond supply system, demountable components such as a front loader, but also to a front axle suspension circuit 100 depicted in detail in FIG. 1. Other consumers, such as the auxiliary hydraulics, are only generically indicated by dashed box 30 for clarity reasons.

The suspension circuit 100 comprises a ring side circuit 110 including a left suspension hydraulic cylinder 120 assigned to the left wheel suspension (indicated with dotted lines SL) of a front axle and a right suspension hydraulic cylinder 125 assigned to the right wheel suspension (indicated with dotted lines SR) of a front axle. Details of a front axle suspension are shown in European Patent Publication EP 1 600 311 A1, "Tractor with Front Suspension," published Nov. 30, 2005, and indicated with dotted lines, are not relevant to understanding of the present disclosure, and are not described in detail hereinafter.

Left suspension hydraulic cylinder 120 has a ring side 120*a* and a piston side 120*b* separated by piston 120*c*. Right suspension hydraulic cylinder 125 has a ring side 125*a* and a piston side 125*b* separated by piston 125*c*. Ring sides 120*a*, 125*a* are conjointly connected to main pump 20 via ring side circuit 110. The fluid in ring side circuit 110 can freely move between piston sides 120*a*, 125*a*.

Ring side circuit 110 furthermore comprises a check-valve 130 to block flow in a direction opposite to the delivery direction of pump 20. The ring side circuit 110 has a central hydraulic accumulator 140 for damping the ring sides 120*a*, 125*a* of the cylinders 120, 125. The hydraulic accumulator 140 is filled with a pressurized gas at a level of, for example, 45 bar (separated to the circuit fluid by a membrane) to damp pressure shocks in ring side circuit 110.

Piston side 120*b* and piston side 125*b* are connectable to the main pump 20 via a piston side circuit 200.

Piston side circuit 200 includes a suspension raising valve 201 movable by solenoid control and by manual actuation into a first and second position 201*a*, 201*b* for raising the suspension. The piston side circuit 200 also includes a suspension lowering valve 202 for lowering the suspension, a first pressure limiting valve 203, a roll stability valve 204 movable by solenoid control into a first and second position 204*a*, 204*b* for controlling roll movement of the suspension, and a second pressure limiting valve 205.

For providing damping functionality, piston side circuit 200 further comprises a suspension valve block indicated with dotted lines 300. A damping valve 310 is integrally provided in the suspension valve block 300 to enable or block the connection of piston side 120*b* to a left hydraulic accumulator 400 and piston side 125*b* to a right hydraulic accumulator 401. The presence of two separate hydraulic accumulators 400, 401 provides independent wheel suspension system (as shown in the above referenced EP 1 600 311 A). Suspension valve block 300 is arranged to detachably assemble hydraulic accumulators 400, 401 as described in further detail below.

The functionality of the suspension circuit 100 is explained now in detail with a suitable control system incorporated but not depicted in detail. As illustrated in FIG. 8, in an embodiment, the control system will typically comprise a monitor 101 incorporated in an operator cab of the vehicle 1. The monitor 101 is part of the control system which includes at least one processor and memory and which is in communication with the various valves in the hydraulic supply system.

In the context of the shown suspension system, the terms "raise" or "raising" mean that the (front) vehicle body VB of the vehicle is raised compared to the position of wheel W standing on ground G.

The initial condition of the (front axle) suspension circuit 100 is as shown in FIG. 1, with ring side circuit 110 being supplied by fluid (at a pressure depending on pump displacement) and the piston supply circuit 200 not being connected to the pump 20. The fluid supply to ring side circuit 110 results in ring sides 120*a*, 125*a* being pressurized so that the suspension system SL, SR is in a lowered position. This position is normally chosen to park or shutdown the vehicle. In this state, any leakage in the circuit would not result in unintended movement. This may also be the state chosen as appropriate for doing maintenance work. Valves 201, 202, 204, and 310 are in the positions as depicted in FIG. 1.

Before the vehicle would be placed into operational mode and driven away, a mid-position of the axle suspension SL, SR would be implemented. This involves the solenoid of main raising valve 201 being energized to move into the position indicated with 201*b*. As roll stability valve 204 is in position 204*a* (biased by a spring), both piston sides 120*b*, 125*b* of the cylinders 120, 125 would be pressurized. With the ring sides 120*a*, 125*a* being simultaneously pressurized via ring side circuit 110, the pressure balance at pistons 120*c*, 125*c* would result in downward movement (due to the greater effective surface of piston side) to raise the suspension and the vehicle body VB until a mid-position (or any other selected position) is reached. The position is detected with suspension position sensors, e.g., which determine the angle of the suspension links relative to vehicle body VB, which sensors are generally known and are not described herein. If the selected position is reached, main raising valve 201 would block the connection (in position 201*a*). In this position, the fluid in piston circuit 200 can freely move between piston sides 120*b*, 125*b* while the ring sides 120*a*, 125*a* are also connected for fluid exchange.

Both the piston sides 120*b*, 125*b* of cylinders 120, 125 are connectable to tank 21 (the fluid sump shown at the bottom of FIG. 1) via pressure limiting valves 205, 203 if the pressure in piston supply circuit 220 exceeds a certain level, e.g., 250 bar. This may occur if external forces move pistons 120*c*, 125*c* upwards (for example when the vehicle impacts on an obstacle such as a larger stone on a field) and the fluid would be additionally pressurized which may damage components in the fluid system but also the mechanical systems of the suspension. After overpressure is discharged to tank 21, the suspension position sensors may detect deviation in demand position so that raising valve 201 is energized again to re-adjust position of the suspension SL, SR.

Generally, under normal operation, the suspension system can be raised and lowered by external forces, which is especially suitable for off-road operation.

On the other hand, during road travel at high speeds, especially on high vehicle speeds when passing curves, this degree of freedom may result in critical situations. When traversing a curved path at higher speeds, the inertia of the vehicle mass can result in roll movements so that wheels may lose ground contact and the vehicle may tip transversely to the driving direction. Accordingly, the control system or the driver can block the fluid exchange between piston sides 120*b*, 125*b* of cylinders 120, 125 by energizing roll stability valve 204 to select position 204*b*. The suspension is then stabilized in the transverse direction.

In all operating conditions, excessive shocks on the vehicle body VB can be mitigated by a damping function which can be activated, e.g., by the vehicle control system or the driver above a certain vehicle speed. If a solenoid of suspension lock valve 310 is energized to move a slider of the valve 310 into the position indicated with 300*b*, the left hydraulic accumulator 400 is connected to piston side 120*b* of left suspension hydraulic cylinder 120 and the right hydraulic accumulator 401 is connected to piston side 125*b* of right suspension hydraulic cylinder 125.

Accumulators 400, 401 contain a pressurized gas at a level of, e.g., 45 bar (separated from the circuit fluid by a membrane) to damp pressure shocks. If the demand is to deactivate damping, suspension lock valve 310 is moved back to the position indicated with 310*a* again.

Figure 2:
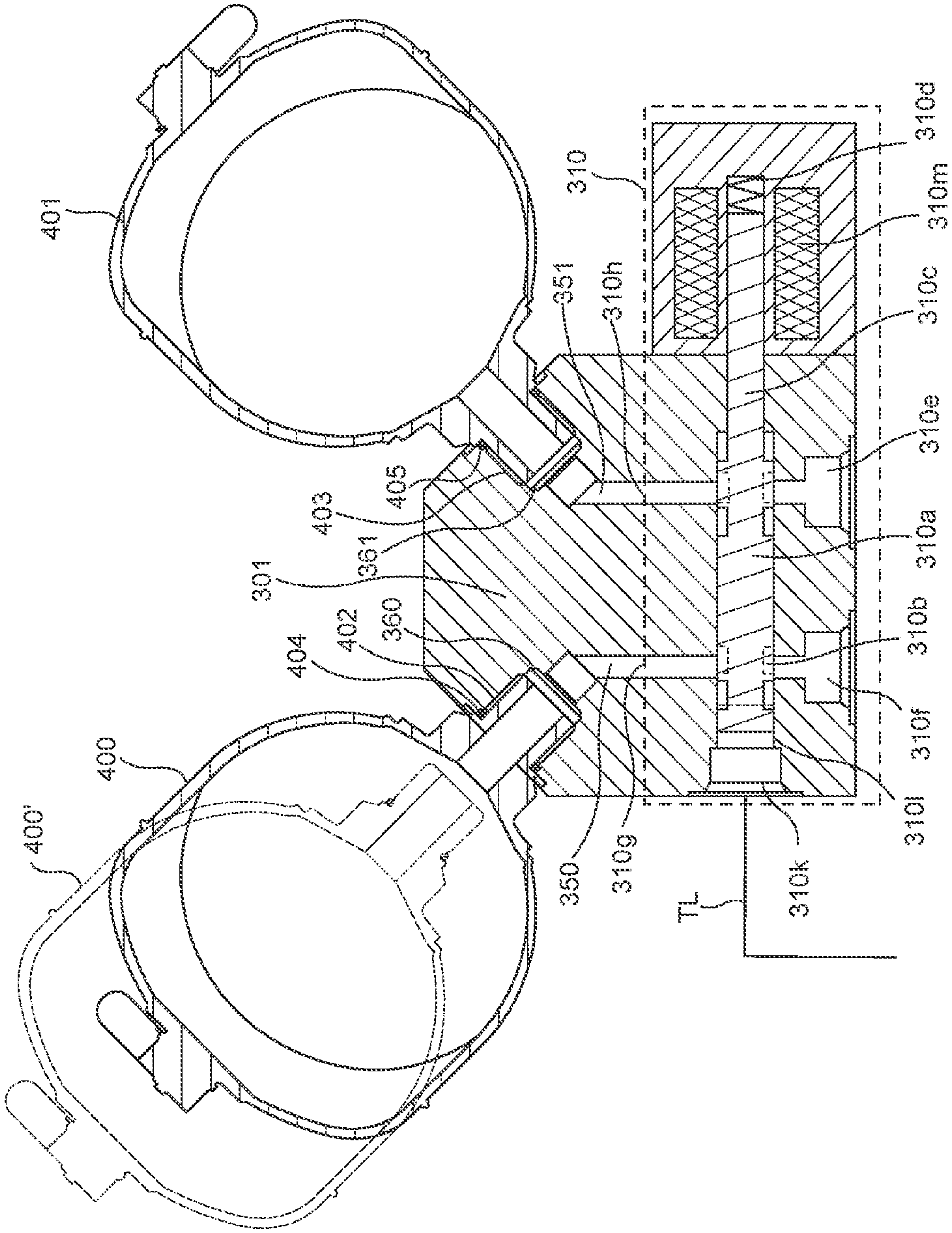
FIG. 2 shows a simplified representation of a valve block and connection system as used in the prior art.

With reference to FIG. 1, and additionally FIG. 2 which shows a simplified representation of a known valve block 300, the assembly and hydraulic connection of the hydraulic accumulators 400, 401 is now explained.

The valve block comprises a valve block body 301 in which the damping valve 310 is integrated (as indicated with dotted lines). The damping valve 310 consists of a valve slider 310*c* biased by spring 310*d* into position 310*a* (as shown) and movable to position 310*b* (indicated with dashed lines) by energizing valve solenoid 310*m*. In position 310*a* as shown in FIG. 2, the inlet ports 310*e*, 310*f* are blocked so that the hydraulic cylinders 120,125 are not fluidically connected to outlet ports 310*g*, 310*h*.

The valve body 301 is also providing a system for assembling and connecting the hydraulic accumulators 400, 401 to the piston side circuit 200, especially the damping valve 310. For this, valve block 300 contains a first fluid duct 350 which is connected to outlet port 310*g* of damping valve 310 and extends into a threaded connection bore or socket 360. Similarly, a second fluid duct 351 is connected to outlet port 310*h* of damping valve 310 and extends into a threaded connection bore or socket 361. The valve body 301 furthermore contains a tank port 310*k* for connection to tank via tank line TL. The tank port 310*k* serves to forward the fluid leaking through the gap between the valve slider 310*c* and the slider bore 3101.

Each of the inlet ports 310*e*, 310*f* and tank port 310*k* may be connected to respective circuits by screw-in or bayonet fittings and associated pipes or hoses.

The threaded connection bores or sockets 360, 361 are used to screw in the left- and right-side hydraulic accumulators 400,401. Hydraulic accumulators 400,401 are equipped with respective male threads 402, 403 for connection. Sealing is provided by sealing rings 404, 405 to safely close the fluidic system to the ambient to avoid leakage.

Because consumers can require different damping characteristics for their application, the hydraulic accumulators 400, 401 may be disassembled to adjust the gas pressure level. Additionally, the gas within them must occasionally be refilled due to leakage, or the hydraulic accumulators must be exchanged when broken.

When the vehicle is shut down for maintenance (with damping valve 310 previously in position 310*b*), damping valve 310 moves back to position 310*a*. In this condition, the fluid is trapped at high pressure level in the ducts 350, 351 and connection bores 360, 361. If a service personnel is now disassembling one of hydraulic accumulators 400,401 by unscrewing, a position may be reached in which the high pressure overcomes the retention force of the thread connection and the hydraulic accumulator is suddenly thrown out in a direction towards the service personnel as indicated with dotted lines 400'. Furthermore, pressurized fluid may be ejected from the coupling or mounting of the accumulator, with high pressure, and hit the service personnel and bystanders. The ejection of both the accumulator and fluid may cause serious injuries.

Figure 3:
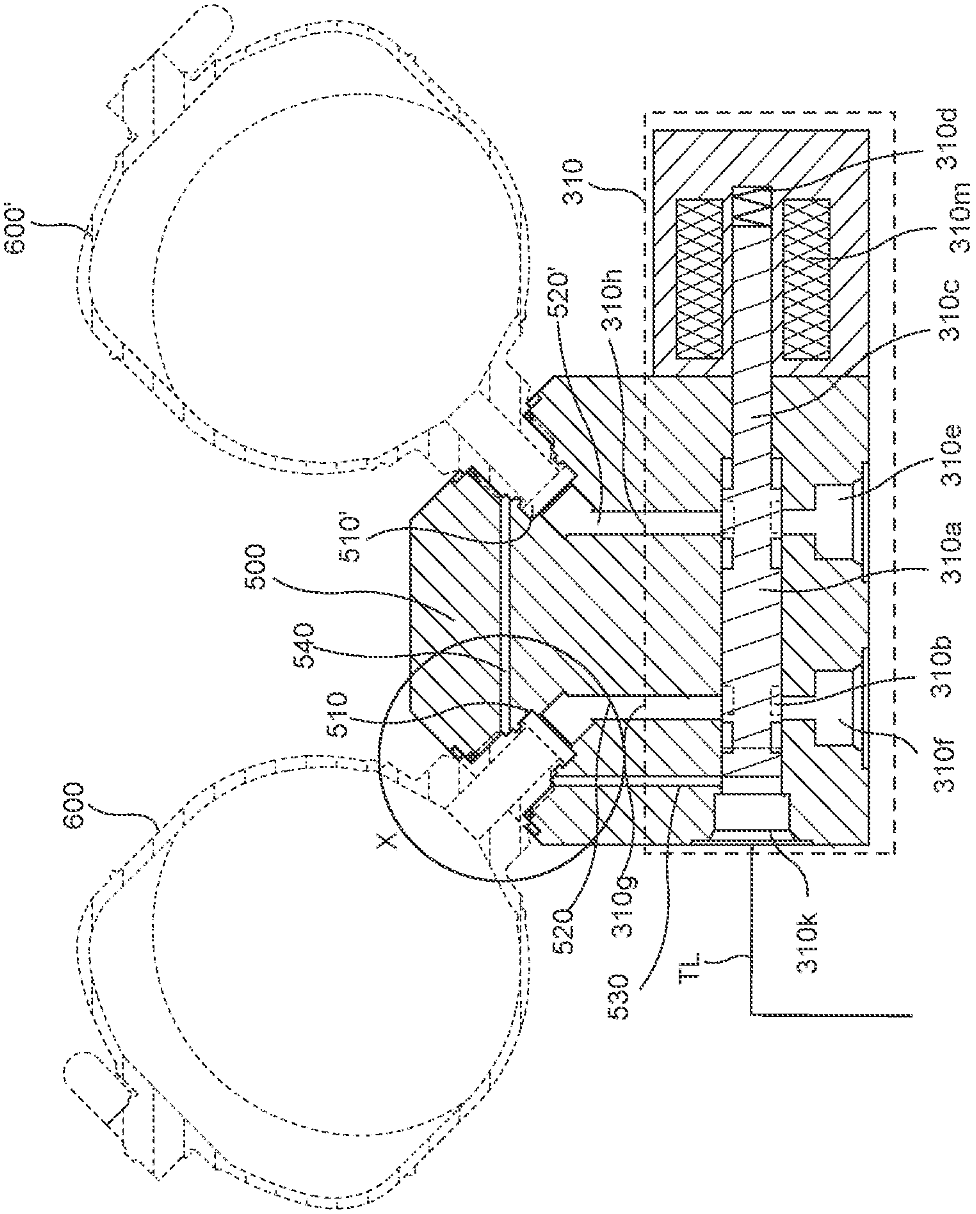
FIG. 3 shows a simplified representation of a valve block and connection system in an assembly according to a first embodiment of the disclosure.

An embodiment of an assembly and connection system in accordance with an aspect of the disclosure is provided as shown in FIG. 3. Where the components are the same as for FIG. 2, they will not be again described. The functionality of the damping valve 310 remains the same as described with FIG. 2 and is therefore not described again in detail. Hydraulic accumulators 600, 600' are shown in dashed lines for clarity reasons.

In similar manner to the arrangement of FIG. 2, the valve block body 500 defines a first connection recess or socket 510 at the end of channel 520 for connection of a first hydraulic accumulator 600 and a second connection recess or socket 510' at the end of channel 520' for connection of a second hydraulic accumulator 600'. First connection recess or socket 510 is fluidically connected to outlet port 310*g* of damping valve 310 via first fluid duct 520. Similarly, second connection recess or socket 510' is fluidically connected to outlet port 310*h* of damping valve 310 via second fluid duct 520'. Similar to the prior art arrangement shown in FIG. 2, fluid may be trapped at high pressure level in the connection recesses 510, 510' and in ducts 520, 520', causing the problems described above.

By the arrangement of FIG. 3, and in further embodiments disclosed below, provisions are introduced for the connection system in the form of one or more discharge ducts to mitigate this problem.

The valve block body 500 has a first discharge duct 530 extending through the body from a first end to a second end, wherein the second end connects the first connection recess (socket) 510 and the first end exits the body 500 at the tank port 310*k*. Because the first connection recess 510 and first fluid duct 520 are also connected, there is a fluidic connection between the first discharge duct 530 and the port 310*g* of damping valve 310.

For the second detachable component in the form of second accumulator 600', a second discharge duct 540 connects second connection recess 510' to the first connection recess 510. As second connection recess 510' and second fluid duct 520' are also connected, and there is a fluid connection between the second discharge duct 540 and the port 310*h* of damping valve 310. The first and second discharge ducts 530, 540 enable discharge of the fluid which is trapped at high pressure level.

Details are explained with reference to FIGS. 4A, 4B, 4C, and 4D (and additionally FIG. 3) whereby the view is pivoted about 45° and 3 different positions of the connecting system are depicted. While the detail X of FIG. 4A only shows the connection system for assembling hydraulic accumulator 600, the assembly of hydraulic accumulator 600' is working exactly the same way. In some embodiments, the system may use one hydraulic accumulator 600 only. In such embodiments, the second discharge duct 540 may be omitted.

In a first assembly position, also referred to as the assembled or locked position, and shown in FIG. 4A, the hydraulic accumulator 600 is fully screwed-in and assembled for normal vehicle operation.

Hydraulic accumulator 600 has a component connecting portion in the form of tubular connecting protrusion 610 to provide fluid connection to the accumulator 600 when the portion is screwed or otherwise connected into the socket 510 of the body 500. Tubular connecting protrusion 610 contains a first male thread portion 611 for engagement with a first threaded recess portion 511 of connection recess 510 to keep the hydraulic accumulator 600 in position. A stop surface 612 of hydraulic accumulator 600 engages with a mating surface 512 in the valve block body 500. Furthermore, a first sealing ring 620 is compressed between stop surface 612 and first male thread portion 611 for tight sealing.

In some embodiments, a second cylindrical portion 513 of connection recess 510 receives a second cylindrical portion 613 of connecting protrusion 610. The second cylindrical portion 613 may have a radial groove 614 to receive a second sealing ring 630 to provide tight sealing. In this way, connection recess 510 is closed towards first fluid duct 520, and trapped fluid cannot flow further (that is to say it can only flow in and out of the accumulator 600).

As best seen in FIG. 4B, in the assembled position, the first discharge duct 530 and second discharge duct 540 are still fluidically connected via a ring chamber indicated with 514 which is provided by a chamfer 515 between first threaded recess portion 511 and second cylindrical portion 513 which is distal to a step contour 615 between first male thread portion 611 and second cylindrical portion 613. The ring chamber 514 is closed towards the first fluid duct 520 by sealing ring 630.

As first discharge duct 530 and second discharge duct 540 extend into the socket/connection recess 510 distal to second cylindrical portion 513, the second sealing ring 630 is not moved over intersecting edges of discharge ducts 530, 540 and connection recess 510. This reduces the danger that second sealing ring 630 is destroyed or damaged during assembly.

In a second position, also referred to as the discharge position and as shown in FIG. 4C, the hydraulic accumulator 600 is partly disassembled with the accumulator 600 moved in an upwards direction away from the body 500 during maintenance. However, the accumulator 600 is safely kept in relative position to the valve block body 500 by the retention force of the mechanical connection, which is the threaded connection between first male thread portion 611 and first threaded recess portion 511. As the pressure is immediately reduced through the increased volume provided by first discharge duct 530 and/or second discharge duct 540, the accumulator would be averted from blowing out of the connection even if the assembly is disassembled continuously.

As the second sealing ring 630 is moved away from second cylindrical recess portion 513 of the connection recess 510, tight sealing no longer occurs, and the trapped fluid is now able to flow from the first fluid duct 520 into the first discharge duct 530 so that the fluid is discharged safely towards tank port 310*k* (shown in FIG. 3). In this position, the threaded engagement between the first male thread portion 611 of hydraulic accumulator 600 and the first threaded recess portion 511 of valve block body 500 provides sufficient retention force to keep the hydraulic accumulator 600 in the shown position until the pressure in the first fluid duct 520 is fully discharged.

With reference to FIGS. 3, 4A, and 4B, if the second accumulator 600' would be brought into a similar discharge position, trapped pressurized fluid can flow from the second fluid duct 520' into the second discharge duct 540. As the second discharge duct 540 is connected to the first discharge duct 530 via the ring chamber 514, pressure discharge is enabled even if the accumulator 600 is in the assembled position.

In a third position, also referred to as the disassembled position and shown in FIG. 4D, the hydraulic accumulator 600 is fully disassembled during maintenance, and the connecting protrusion 610 of hydraulic accumulator 600 and first connection recess (socket) 510 do not engage anymore.

In the shown embodiment, the valve block body 500 is mainly machined from a single piece of steel. In practical terms, it is necessary to position first discharge duct 530 and second discharge duct 540 in such a way that both can be machined through the connection recess 510, as indicated in FIG. 4D with a drilling tool D.

Alternatively, valve block body 500 may be produced by casting using lost form to enable creation of the discharge duct without the aforementioned machining restrictions.

In the above described embodiment, only damping valve 310 is integrated within valve block body 500. However, other valves such as suspension raising valve 201, suspension lowering valve 202 or roll stability valve 204 may also be integrated in the same single valve block. Additionally, the functions provided by valves 201, 202, 204 or 310 may be integrated in one valve (having one valve slider). These variations of the disclosure are known in the art and need not be described further.

Figure 5:
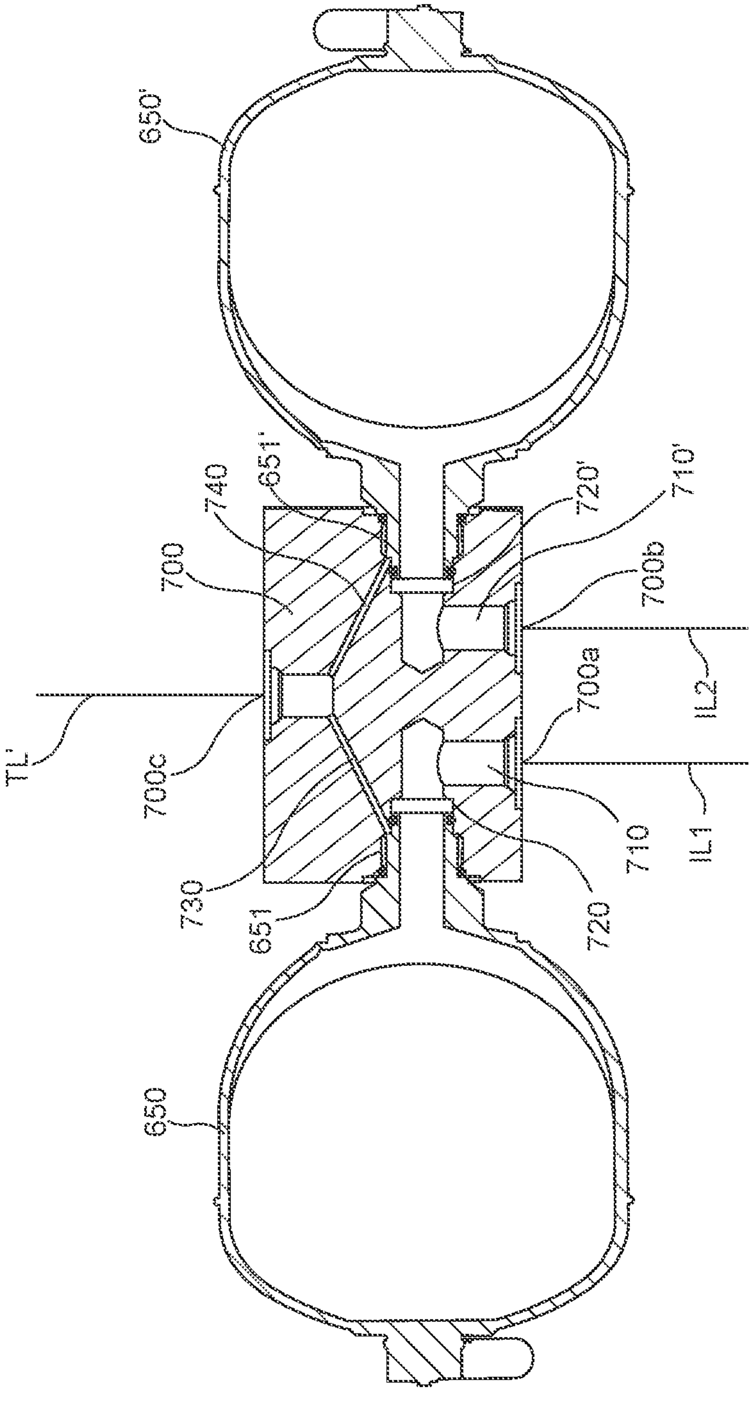
FIG. 5 shows a further embodiment of the disclosure.

A further embodiment is now described with reference to FIG. 5. In this case a support block 700 connects a pair of hydraulic accumulators 650, 650' using connecting portions or protrusions 651, 651'. In contrast to the embodiments described above, the support block 700 has no integrated valves as the valves are installed at a different place, distant to the hydraulic accumulators 650, 650'. Reasons for this may be constraints on installation space or accessibility to the accumulator when the valves are installed in a non-accessible area.

The support block 700 has two inlet ports 700*a*, 700*b* for connection with a distal valve or valve block (not shown) via input lines IL1, IL2. Inlet port 700*a* is fluidically connected to first fluid duct 710 and thereby to first connection recess or socket 720, which connects hydraulic accumulator 650. Similarly, inlet port 700*b* is fluidically connected to second fluid duct 710' and thereby to second connection recess or socket 720', which connects hydraulic accumulator 650'.

Under similar conditions regarding valve operation as described above, the fluid at high pressure level may be trapped in fluid ducts 710, 710' resulting in the aforementioned problems during maintenance.

To mitigate this problem, the support block 700 is provided with a first discharge duct 730 which connects the first connection recess 720 to a tank port 700*c* (exit to tank line TL' or other discharge point for the pressurized fluid). Similarly, a second discharge duct 740 also connects the second connection recess 720' to the tank port 700*c*. Tank port 700*c* is connected to a tank or reservoir by tank line TL'.

The assembly of accumulators 650, 650' with connecting protrusions 651, 651' engaging with connection recess 720, 720' is similar to that described above with reference to FIGS. 3, 4A, 4B, 4C, and 4D, and is therefore not explained in detail again. The embodiments may also enable safe disassembly as the overpressure is discharged through discharge ducts 730, 740.

A further embodiment is now shown and described with reference to FIGS. 6A and 6B. In this embodiment, a driveline housing integrally forms support block 800 to connect hydraulic accumulator 660 using connecting protrusion 670. The driveline housing also provides an internal fluid reservoir 801 for receiving fluid returned by hydraulic circuits. Again, the valves are installed at a different place, distal to the hydraulic accumulator 660.

The support block 800 is provided with an inlet port 802 for connection with a distal valve or valve block (not shown) via input line IL3. Inlet port 802 is fluidically connected to a fluid duct 810 and thereby to a connection recess 820, which receives protrusion 670 and thereby connects hydraulic accumulator 660. Under similar conditions regarding valve operation as mentioned before, the fluid at high pressure level may be trapped in fluid duct 810 resulting in the aforementioned problems during maintenance.

To mitigate this problem, the support block 800 has a discharge duct 830 that connects the first connection recess 820 to the reservoir provided inside the driveline housing. This solution is advantageous as no further lines for connection to a tank are required.

The assembly of hydraulic accumulator 660 with connecting protrusions 670 engaging with connection recess 820 is similar to that described with reference to FIGS. 3, 4A, 4B, 4C, and 4D and is therefore not explained in detail again. The embodiments may also enable safe disassembly as the overpressure is discharged through discharge duct 830.

Figure 6B:
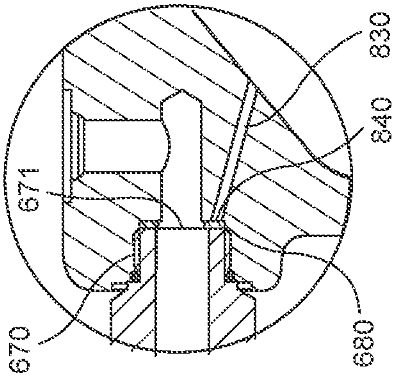
FIG. 6B shows detail Z of FIG. 6A of the disclosure.

With reference FIG. 6B, an alternative sealing approach is shown. The sealing 680 is not of radial sealing type as shown in FIGS. 4A-4D, but of axial sealing type. With this arrangement, connection recess 820 and connecting protrusions 670 can be simplified to reduce time for machining as no previously described radial surface in connection recess 820 is required. Regarding the connecting protrusions 670 the previously described radial surface with a groove for taking a radial sealing ring can also be omitted.

It may even possible to omit any sealing, e.g., if a self-sealing thread connection is used, such as the known NPT thread. Alternatively, if sufficient sealing is provided by two planar surfaces or any other known sealing such as "cutting edges" seals (according ISO 1179-4:2007 "Connections for general use and fluid power. Ports and stud ends with ISO 228-1 threads with elastomeric or metal-to-metal sealing. Stud ends for general use only with metal-to-metal sealing (type B)"), wherein an edge is deformed in assembled position for providing sealing.

Accordingly, the discharge duct 830 intersects with the connection recess 820 at the recess ground surface 840. The axial seal 680 is then compressed between the recess ground 840 and a plane end 671 of the connecting protrusions 670. The axial seal 680 may be connected to connecting protrusions 670

In this embodiment, the second sealing may be omitted if a metal-to-metal contact of the mating surface is tight enough. This may be suitable for lower pressure levels trapped therein.

Figure 6A:
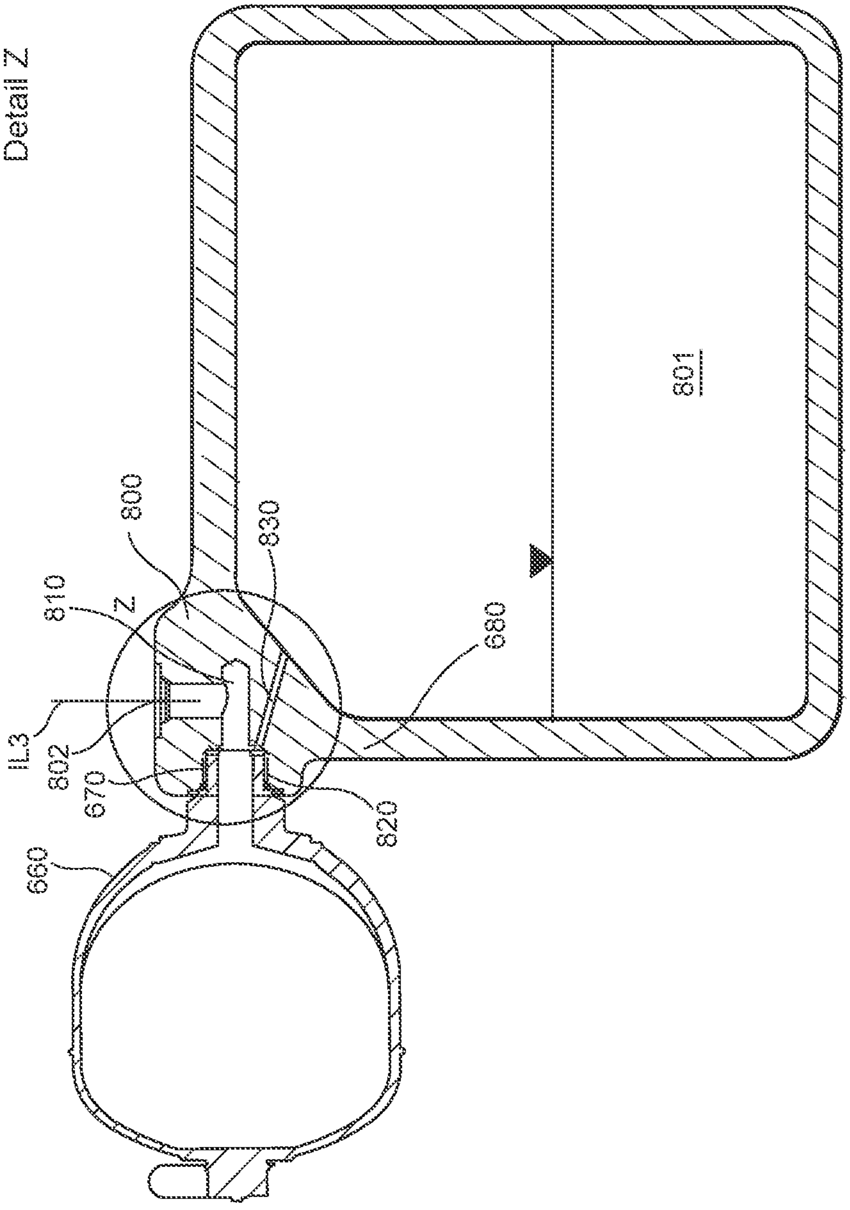
FIG. 6A shows a yet further embodiment of the disclosure.

The sealing system as described in FIGS. 6A and 6B may also be provided in the previous embodiments.

Figure 7B:
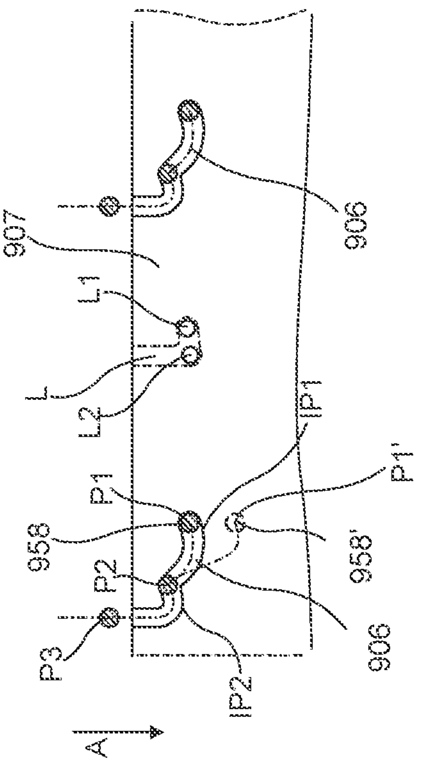
FIG. 7B shows a circumferential surface of the cylindrical recess surface from the embodiment of FIG. 7A.
Figure 7A:
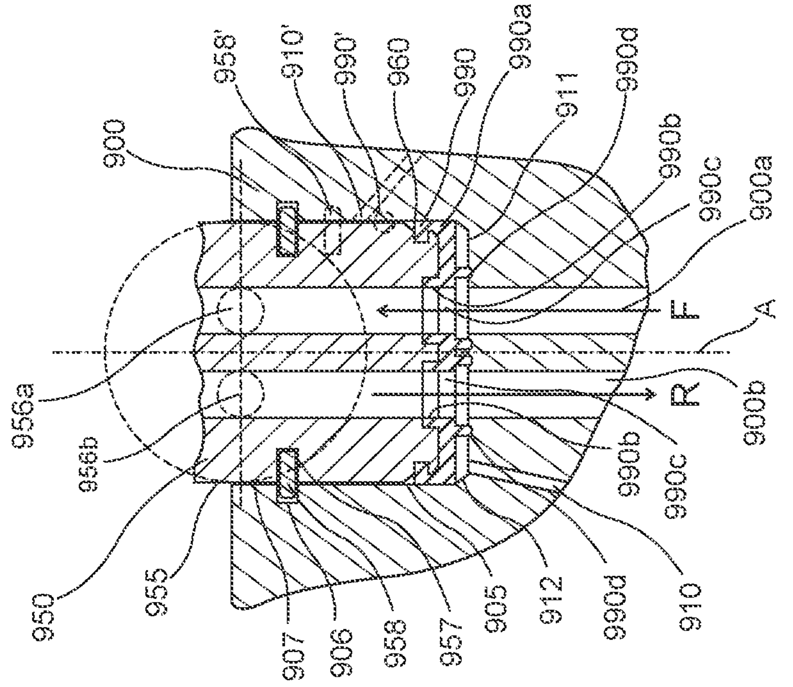
FIG. 7A shows a still further embodiment of the disclosure.

A further embodiment is now shown with FIGS. 7A and 7B. In this embodiment, a bayonet joint is used to connect a support block 900 and fluid filter 950 (oil filter). Different to the embodiments shown before, the fluid circulates within oil filter 950 (indicated with arrows F for inflow and R for return flow) to provide fluid cleaning so that it is required to exchange when the filter element (not shown) is overloaded with debris. A sealing 990 is also provided and explained below.

The oil filter 950 is not shown in detail but is provided with a cylindrical connecting protrusion 955. Connecting protrusion 955 has an inlet duct 956*a* and an outlet duct 956*b* to circulate the fluid. Similarly, support block 900 comprises an inlet duct 900*a* and an outlet duct 900*b* which extend into a cylindrical connecting recess 905. Inlet duct 956*a*, outlet duct 956*b*, inlet duct 900*a*, and outlet duct 900*b* are positioned distal to the rotational axis A. As inlet duct 956*a* matches with inlet duct 900*a* and outlet duct 956*b* matches with outlet duct 900*b* for proper fluid flow, a bayonet joint is used, which has the major advantage that the relative position of the ducts is always kept when assembled (different to a screw joint in which rotational alignment cannot be guaranteed).

Therefore, connecting protrusion 955 is provided with radial bores 957 to fix two cam pins 958 which slide in two radial bayonet grooves 906 on the circumferential recess surface 907 provided by cylindrical connecting recess 905.

FIG. 7B shows the circumferential recess surface 907 unfolded into the drawing plane to explain the bayonet joint.

A bayonet groove as known in the art is mainly L-shaped (as indicated with L in FIG. 7B). In the assembled position, the cam pin 958 is in position L1. For disassembling, the oil filter 950 is rotated about axis A in anti-clockwise direction. Thereby, the operator has to overcome a counterforce applied by a sealing (such as sealing 990) or a biasing spring (not shown). If the counterforce is overcome, the oil filter (and cam pin 958) can be moved to an intermediate position indicated with L2 and can then be moved straight upwards to disassemble the oil filter 950. If fluid is trapped at a high pressure level in any of inlet duct 956*a*, outlet duct 956*b*, inlet duct 900*a*, and/or outlet duct 900*b*, the oil filter may be rapidly thrown upwards and hit the operator. Even if the high pressure would increase the counterforce necessary to move the oil filter from position L1 to L2, the operator may use a tool to increase the manually applied torque and overcome the counterforce. Again, the filter would then be suddenly thrown towards the operator.

According to a further embodiment of the disclosure, the connecting recess 905 of support block 900 may have a discharge duct 910 that extends to the ground surface 911 and is connectable to inlet duct 900*a* and/or outlet duct 900*b*. When the oil filter is moved upwards, fluid under high pressure can be discharged similar to the embodiments described above. Discharge duct 910 is further connected to a tank or reservoir as described before.

In the locked or assembled position, the fluid connection between discharge duct 910 and inlet duct 900*a* and/or outlet duct 900*b* is blocked by sealing 990. Sealing 990 is fixed to the oil filter 950 by a circumferential snap-in contour 990*a*, which engages in a radial cut 960 in connecting protrusion 955 for axial fixation. Furthermore, two cylindrical lips 990*b* engage into inlet duct 956*a*, outlet duct 956*b* to ensure that the bores 990*c* in sealing 990 match with the respective inlet duct 956*a*, 956*b*. Towards the ground surface 911, two ring-shaped sealing contours 990*d* are provided to firstly seal the inlet duct 956*a* with inlet duct 900*a* and outlet duct 956*b* with outlet duct 900*b*, but also to form a sealed ring cavity 912 connected to discharge duct 910. Ring cavity 912 is sealed against inlet ducts 900*a*, 956*a* and outlet ducts 900*b*, 956*b* in assembled position. Furthermore, sealing contours 990*d* apply a counterforce against movement of the bayonet connection, which is explained in detail now.

According a further aspect of the disclosure and as best seen in FIG. 7B, the radial bayonet grooves 906 are reshaped to provide at least three positions. As both grooves are identical, reference is made to one only. The cam pin 958 is indicated in different positions along the rotation of the oil filter 950.

In first position P1, also referred to as the locked or assembled position and as shown in FIG. 7A, the oil filter 950 is fully assembled for normal vehicle operation. The counterforce applied by sealing contours 990*e* is safely holding the oil filter 950 in this position.

If an operator now turns the oil filter 950 against the counterforce along intermediate portion IP1, the force applied by the pressure trapped in any of inlet duct 956*a*, outlet duct 956*b*, inlet duct 900*a*, and outlet duct 900*b*, forces the oil filter 950 upwards into second position P2, which is the discharge position. As the sealing contours 990*d* are distal to ground surface 911, fluid can be freely discharged via ring cavity 912 and discharge duct 910 while the oil filter 950 is safely kept in relative position to the support body 900 as cam pin 958 in grove 906 stops any further upwards movement. In this way, intermediate position IP2 first extends downwards (indicated with Arrow A) before oil filter 950 can be further moved upwards. As the pressure is immediately reduced through the increased volume provided by ring cavity 912 and discharge duct 910, the oil filter 950 can be disassembled nearly continuously.

When the oil filter 950 is further rotated along intermediate portion IP2, with the pressure fully discharged, the operator can further move the oil filter 950 upwards safely into third position P3, the disassembled position.

The shown shape of grooves 906 is exemplary to support clarity. The shape may be optimized to safely keep assembled position P1 and discharge position P2 but to minimize downwards movement (against counterforce applied by sealing 990) for smoother and easier rotation.

The bayonet connection may also work with a radial sealing (indicated with 950') if there is only one inflow duct. The discharge duct (indicated with 910') may then radially extend into cylindrical connecting recess 905. The radial bayonet grooves 906 cooperating with offset cam pin 958' may then be reshaped so that the discharge duct 910' enables discharge of pressure in discharge position P2. With reference to FIG. 7B, the assembled position P1' would be positioned further downwards to enable sealing 990" to pass the intersection between discharge duct 910' and cylindrical connecting recess 905 before discharge position P2 is taken.

In the described embodiment, the fluid is hydraulic oil. The disclosure can also be used for pneumatic components.

All references cited herein are incorporated herein in their entireties. If there is a conflict between definitions herein and in an incorporated reference, the definition herein shall control.

While the present disclosure has been described herein with respect to certain illustrated embodiments, those of ordinary skill in the art will recognize and appreciate that it is not so limited. Rather, many additions, deletions, and modifications to the illustrated embodiments may be made without departing from the scope of the disclosure as hereinafter claimed, including legal equivalents thereof. In addition, features from one embodiment may be combined with features of another embodiment while still being encompassed within the scope as contemplated by the inventors. Further, embodiments of the disclosure have utility with different and various machine types and configurations.

What is claimed is:

1. An assembly system for components of a pressurized fluid supply system for an agricultural vehicle, the system comprising:

a body having at least one fluid duct extending therethrough from a first end to a second end, wherein the at least one fluid duct is configured to connect at the first end to a pressurized fluid supply via a first connection and wherein the at least one fluid duct comprises a socket at the second end; and a detachable accumulator connectable in releasable mechanical engagement with the body to receive pressurized fluid from the at least one fluid duct, the releasable mechanical engagement resulting from insertion of at least a portion of the detachable accumulator into the socket and rotation of the detachable accumulator to a locked position;

wherein the body defines at least one discharge duct extending therethrough from a first end exiting the body to a second end intersecting the socket;

wherein in a partially rotated position of the at least a portion of the detachable accumulator within the socket, the detachable accumulator remains mechanically attached to the body and the at least one fluid duct and the at least one discharge duct are in fluidic connection; and wherein the locked position comprises a fully rotated position of the at least a portion of the detachable accumulator within the socket, in which position the at least a portion of the detachable accumulator blocks the fluidic connection between the at least one fluid duct and the at least one discharge duct.

2. The assembly system of claim 1, wherein the body is a valve block comprising at least one valve slider intersecting the at least one fluid duct.

3. The assembly system of claim 1, wherein the body is a driveline housing.

4. The assembly system of claim 3, wherein the driveline housing defines a fluid reservoir to which the first end of the at least one discharge duct connects.

5. The assembly system of claim 1, wherein the body comprises a second fluid duct with a respective socket to receive a second detachable component, and wherein the body defines a second discharge duct which is connectable to the second fluid duct.

6. The assembly system of claim 5, wherein the second discharge duct is connected to the first discharge duct via a ring chamber of the socket of the first fluid duct.

7. The assembly system of claim 1, further comprising a seal configured to block fluid flow between the at least one fluid duct and the discharge duct when in the locked position.

8. The assembly system of claim 1, wherein the connection of the, or each, detachable accumulator comprises a first threaded portion configured to engage with a corresponding threaded bore in the socket.

9. The assembly system of claim 1, wherein the connection of the detachable accumulator comprises a radial sealing.

10. The assembly system of claim 1, wherein the connection of the detachable accumulator comprises a bayonet joint.

11. The assembly system of claim 10, wherein bayonet joint comprises a groove having two intermediate portions.

12. The assembly system of claim 1, wherein the at least one discharge duct intersects with a ground surface of the socket.

13. An assembly system for components of a pressurized fluid supply system for an agricultural vehicle, the system comprising:

a body having a first fluid duct extending therethrough from a first end to a second end, wherein the first fluid duct is configured to connect at the first end to a pressurized fluid supply via a first connection and wherein the first fluid duct comprises a first socket at the second end; and a first detachable component connectable in releasable mechanical engagement with the body to receive pressurized fluid from the first fluid duct, the releasable mechanical engagement resulting from insertion of at least a portion of the first detachable component into the first socket and rotation of the first detachable component to a locked position;

wherein the body defines a first discharge duct extending therethrough from a first end exiting the body to a second end intersecting the first socket;

wherein in a partially rotated position of the at least a portion of the first detachable component within the first socket, the first detachable component remains mechanically attached to the body and the first fluid duct and first discharge duct are in fluidic connection; and wherein the locked position comprises a fully rotated position of the at least a portion of the first detachable component within the first socket, in which position the at least a portion of the first detachable component blocks the fluidic connection between the fluid duct and the first discharge duct, wherein the body comprises a second fluid duct with a respective second socket to receive a second detachable component, and wherein the body defines a second discharge duct which is connectable to the second fluid duct.

14. The assembly system of claim 13, wherein the first detachable component comprises a fluid filter.

* * * * *